United States Patent
Bai et al.

(10) Patent No.: US 11,895,654 B2
(45) Date of Patent: Feb. 6, 2024

(54) REFERENCE TRANSMISSION CONFIGURATION INDICATOR POOL

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 17/444,555

(22) Filed: Aug. 5, 2021

(65) Prior Publication Data

US 2023/0039436 A1 Feb. 9, 2023

(51) Int. Cl.
*H04W 72/12* (2023.01)
*H04W 72/20* (2023.01)

(52) U.S. Cl.
CPC ................................. *H04W 72/20* (2023.01)

(58) Field of Classification Search
CPC ..... H04W 72/12; H04W 72/20; H04W 72/04; H04W 72/23; H04W 72/242; H04W 16/28; H04W 80/02; H04W 76/19; H04W 24/00; H04W 28/06; H04W 76/28; H04W 24/08; H04W 72/54; H04L 5/00; H04L 5/14; H04L 1/16; H04L 1/18; H04L 1/08; H04L 1/00; H04B 7/06; H04B 7/024; H04B 7/08; H04B 7/04
USPC ......................................................... 370/329
See application file for complete search history.

(56) References Cited

U.S. PATENT DOCUMENTS

| 11,343,037 | B2 * | 5/2022 | Manolakos | H04W 76/27 |
| 11,398,893 | B2 * | 7/2022 | Venugopal | H04L 5/0092 |
| 11,533,713 | B2 * | 12/2022 | Rahman | H04W 72/20 |
| 11,564,229 | B2 * | 1/2023 | Jin | H04B 7/0413 |
| 2020/0351888 | A1 * | 11/2020 | Xu | H04L 5/001 |
| 2021/0352706 | A1 * | 11/2021 | Kang | H04L 1/0026 |
| 2021/0385832 | A1 * | 12/2021 | Zhang | H04W 72/1263 |
| 2021/0385847 | A1 * | 12/2021 | Kang | H04L 5/0044 |
| 2022/0046458 | A1 * | 2/2022 | Zhu | H04L 43/0823 |
| 2022/0132506 | A1 * | 4/2022 | Bhamri | H04W 72/0453 |
| 2022/0190906 | A1 * | 6/2022 | Haghighat | H04W 76/19 |
| 2022/0256522 | A1 * | 8/2022 | Matsumura | H04L 5/0023 |
| 2022/0302989 | A1 * | 9/2022 | Zhang | H04W 72/044 |
| 2022/0338235 | A1 * | 10/2022 | Bagheri | H04L 5/0044 |
| 2022/0360314 | A1 * | 11/2022 | Zhu | H04W 72/02 |

(Continued)

OTHER PUBLICATIONS

International Search Report and Written Opinion—PCT/US2022/073849—ISA/EPO—dated Nov. 7, 2022.

(Continued)

*Primary Examiner* — Man U Phan
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information indicating a pool of transmission configuration indicator (TCI) states. The UE may receive an indication of a TCI state of the pool of TCI states for a communication in a frequency region that is not configured with a set of TCI states. The UE may transmit or receiving the communication using the TCI state. Numerous other aspects are provided.

30 Claims, 8 Drawing Sheets

(56) References Cited

U.S. PATENT DOCUMENTS

| | | | | |
|---|---|---|---|---|
| 2022/0369299 | A1* | 11/2022 | Cirik | H04B 7/088 |
| 2023/0050015 | A1* | 2/2023 | Kang | H04L 5/0048 |
| 2023/0106244 | A1* | 4/2023 | Yu | H04L 5/0035 |
| | | | | 370/329 |

OTHER PUBLICATIONS

LG Electronics: "Feature Lead Summary#5 of Enhancements on Multi-Beam Operations", 3GPP TSG RAN WG1 Meeting #98bis, R1-1911593, R1#98BIS FL_Summary#5_Multibeam(MB1) V4, 3rd Generation Partnership Project, Mobile Competence Centre, 650, Route Des Lucioles, F-06921 Sophia-Antipolis Cedex, France, vol. RAN WG1. No. Chongqing, China, Oct. 14, 2019-Oct. 20, 2019, Oct. 22, 2019 (Oct. 22, 2019), XP051798848, 28 Pages, pp. 5-7. 2.2, Issue#2.2: Simultaneous spatial relation update for multiple PUCCH resources pp. 7-12. 2.3, Issue#2.3: Default spatial relation for dedicated-PUCCH/SRS in FR2 pp. 12-17. 2.4, Issue#2.4: Simultaneous TCI states activation/selection across multiple CCs/BWPs, Section 2.5, p. 13-p. 17.

MCC Support: "Draft Report of 3GPP TSG RAN WG1 #105-e v0.2.0 (Online Meeting, May 10- 27, 2021)", R1-210xxxx, Draft_Minutes_Report_RAN1#105-E_V020, 3rd Generation Partnership Project, Mobile Competence Centre, 650, Route Des Lucioles, F-06921 Sophia-Antipolis Cedex, France vol. RAN WG1, No. e-Meeting, Aug. 16, 2021-Aug. 27, 2021, Jul. 13, 2021, 141 p. XP052101972, p. 38, Paragraph Referring to R1-2106131, p. 40.

Moderator (Samsung): "Moderator Summary for Multi-Beam Enhancement: Round 3", 3GPP TSG RAN WG1 #105-e, R1-2106167, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021 May 26, 2021, XP052014320, 21 Pages, sections 2-3, p. 2-p. 9.

ZTE: "Enhancements on Multi-Beam Operation", 3GPP TSG RAN WG1 Meeting #102-e, R1-2005454, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020 Aug. 8, 2020, XP051917478, 11 Page, p. 2 figure 3, pp. 7-8, section 3.2.

* cited by examiner

REFERENCE TRANSMISSION CONFIGURATION INDICATOR POOL

FIELD OF THE DISCLOSURE

Aspects of the present disclosure generally relate to wireless communication and specifically, to techniques and apparatuses for a reference transmission configuration indicator (TCI) pool.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Wireless communication devices, such as a UE and a base station, may communicate with each other using beams. A configuration for a beam (such as a spatial parameter used by a wireless communication device to generate the beam) may be defined using a transmission configuration indicator (TCI) state. A TCI state indicates one or more parameters (such as a spatial parameter) and a source signal from which the one or more parameters can be derived. A wireless communication device may be configured with multiple TCI states, referred to as a pool of TCI states. Different pools of TCI states can be used for different situations. Furthermore, different pools of TCI states can be configured for different frequency regions, such as different component carriers or bandwidth parts. As the number of pools of TCI states increases (such as due to configuring multiple pools of TCI states for different situations and different frequency regions), overhead may increase as well, as a respective configuration of a pool of TCI states may be transmitted for each frequency region or each situation.

SUMMARY

Some aspects described herein relate to a method of wireless communication performed by a user equipment (UE). The method may include receiving configuration information indicating a reference pool of transmission configuration indicator (TCI) states. The method may include receiving an indication of a TCI state of the reference pool of TCI states for a communication in a frequency region that is not configured with any set of TCI states. The method may include transmitting or receiving the communication in the frequency region using the TCI state.

Some aspects described herein relate to a method of wireless communication performed by a base station. The method may include transmitting configuration information indicating a reference pool of TCI states. The method may include transmitting an indication of a TCI state of the reference pool of TCI states for a communication in a frequency region that is not configured with any set of TCI states. The method may include transmitting or receiving the communication in the frequency region using the TCI state.

Some aspects described herein relate to a non-transitory computer-readable medium that stores a set of instructions for wireless communication by a UE. The set of instructions, when executed by one or more processors of the UE, may cause the UE to receive configuration information indicating a reference pool of TCI states. The set of instructions, when executed by one or more processors of the UE, may cause the UE to receive an indication of a TCI state of the reference pool of TCI states for a communication in a frequency region that is not configured with any set of TCI states. The set of instructions, when executed by one or more processors of the UE, may cause the UE to transmit or receive the communication in the frequency region using the TCI state.

Some aspects described herein relate to a non-transitory computer-readable medium that stores a set of instructions for wireless communication by a base station. The set of instructions, when executed by one or more processors of the base station, may cause the base station to transmit configuration information indicating a reference pool of TCI states. The set of instructions, when executed by one or more processors of the base station, may cause the base station to transmit an indication of a TCI state of the reference pool of TCI states for a communication in a frequency region that is not configured with any set of TCI states. The set of instructions, when executed by one or more processors of the base station, may cause the base station to transmit or receive the communication in the frequency region using the TCI state.

Some aspects described herein relate to an apparatus for wireless communication. The apparatus may include means for receiving configuration information indicating a reference pool of TCI states. The apparatus may include means for receiving an indication of a TCI state of the reference pool of TCI states for a communication in a frequency region that is not configured with any set of TCI states. The apparatus may include means for transmitting or receiving the communication in the frequency region using the TCI state.

Some aspects described herein relate to an apparatus for wireless communication. The apparatus may include means for transmitting configuration information indicating a reference pool of TCI states. The apparatus may include means for transmitting an indication of a TCI state of the reference pool of TCI states for a communication in a frequency region that is not configured with any set of TCI states. The apparatus may include means for transmitting or receiving the communication in the frequency region using the TCI state.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to receive configuration information indicating a reference pool of TCI states. The processor-readable code, when executed by the at least one processor, may be configured to cause the user equipment to receive an indication of a TCI state of the reference pool of TCI states for a communication in a frequency region that is not configured with any set of TCI states. The processor-readable code, when executed by the at least one processor, may be configured to cause the user equipment to transmit or receive the communication in the frequency region using the TCI state.

Some aspects described herein relate to a base station for wireless communication. The base station may include at least one processor and at least one memory, communicatively coupled with the at least one processor, that stores processor-readable code. The processor-readable code, when executed by the at least one processor, may be configured to cause the base station to transmit configuration information indicating a reference pool of TCI states. The processor-readable code, when executed by the at least one processor, may be configured to cause the base station to transmit an indication of a TCI state of the reference pool of TCI states for a communication in a frequency region that is not configured with any set of TCI states. The processor-readable code, when executed by the at least one processor, may be configured to cause the base station to transmit or receive the communication in the frequency region using the TCI state.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
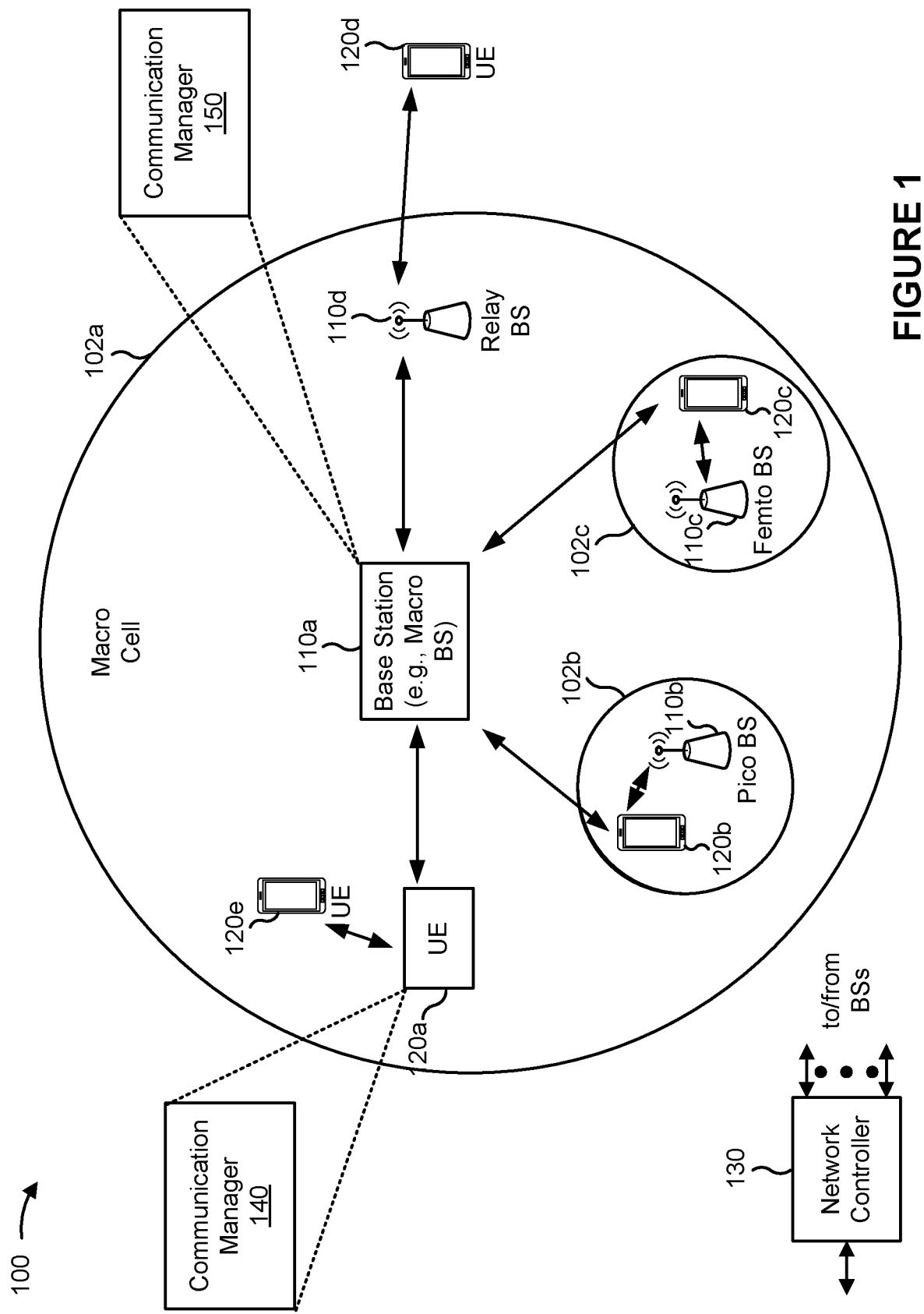
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to configuring or defining a pool of transmission configuration indicator (TCI) states as a reference pool of TCI states. Some aspects more specifically relate to configuring a pool of TCI states that can be used for a frequency region (such as a bandwidth part or a component carrier) that is not configured with its own pool of TCI states. In some aspects, the reference pool of TCI states may be indicated in a configuration of a frequency region. In some other aspects, the reference pool of TCI states may be configured on a reference frequency region, and if a bandwidth part or component carrier is not configured with a pool of TCI states, then the reference pool of TCI states may be used. In some other aspects, the UE may be configured with a set of frequency regions that share the same pool of TCI states (that is, the reference pool of TCI states). Some aspects relate to determination of a TCI state or a spatial filter before a pool of TCI states is configured. Further, some aspects relate to capability signaling to support such configuration and usage of a reference pool of TCI states.

Particular aspects of the subject matter described in this disclosure can be implemented to realize one or more of the following potential advantages. In some examples, the described techniques can be used to decrease overhead associated with configuring pools of TCI states for multiple frequency regions. For example, in some aspects, only a single reference pool of TCI states may be configured. Configuring a single reference pool of TCI states (or one or more reference pools of TCI states) improves the efficiency of TCI state configuration for use cases such as multi transmit receive point (TRP) communication, high frequency communication (such as in Frequency Range 4), and configuration of a larger number of bandwidth parts or component carriers, relative to configuring separate pools of TCI states for each frequency region or TRP in these use cases. Furthermore, the described techniques can increase the size of a pool of TCI states that can be configured (that is, the number of TCI states that can be included in a pool of TCI states). For example, for a given UE capability for storing TCI states, configuring a single reference pool for multiple frequency regions allows the configuration of a larger number of TCI states in the reference pool. In such an example, the reference pool may include TCI states corresponding to refined beams, which improves beamforming gain and which allows the UE to select from a larger number of beams in order to adapt to dynamic changes in wireless channels.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a TRP. Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile.

A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive configuration information indicating a reference pool of TCI states; receive an indication of a TCI state of the reference pool of TCI states for a communication in a frequency region that is not configured with any set of TCI states; and transmit or receiving the communication in the frequency region using the TCI state. Additionally or alternatively, the communication manager 140 may perform one or more other operations described herein.

In some aspects, the base station 110 may include a communication manager 150. As described in more detail elsewhere herein, the communication manager 150 may transmit configuration information indicating a reference pool of TCI states; transmit an indication of a TCI state of the reference pool of TCI states for a communication in a frequency region that is not configured with any set of TCI states; and transmit or receiving the communication in the frequency region using the TCI state. Additionally or alternatively, the communication manager 150 may perform one or more other operations described herein.

Figure 2:
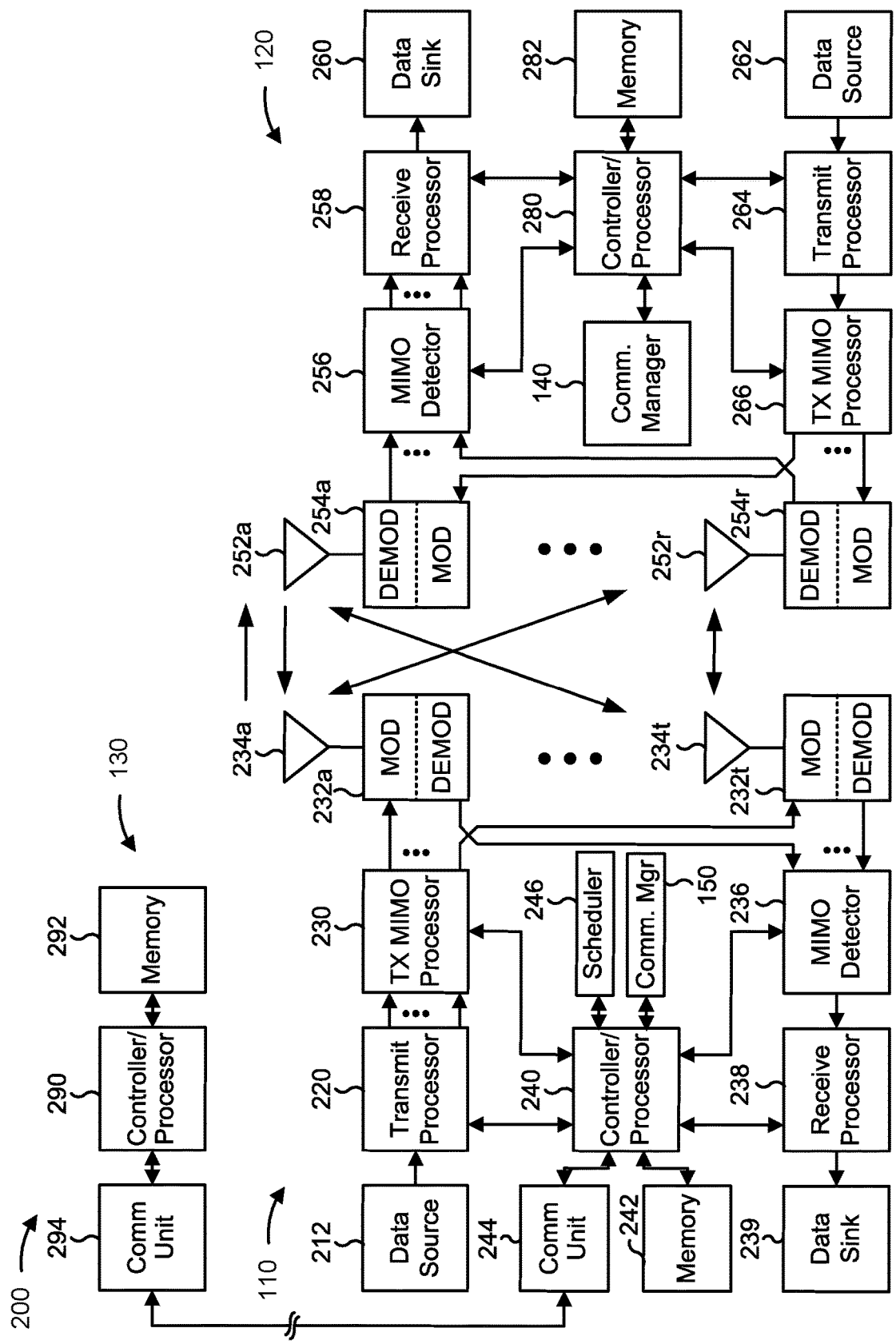
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the base station 110 or other base stations 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with a reference TCI pool, as described in more detail elsewhere herein. For example, the controller/processor 240 of the base station 110, the controller/processor 280 of the UE 120, or any other component(s) of FIG. 2 may perform or direct operations of, for example, process 500 of FIG. 5, process 600 of FIG. 6, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 500 of FIG. 5, process 600 of FIG. 6, or other processes as described herein. In some examples, executing instructions may include running the instructions, converting the instructions, compiling the instructions, or interpreting the instructions, among other examples.

In some aspects, the UE 120 includes means for receiving configuration information indicating a pool of TCI states; means for receiving an indication of a TCI state of the pool of TCI states for a communication in a frequency region that is not configured with a set of TCI states; and means for transmitting or receiving the communication using the TCI state. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting configuration information indicating a pool of TCI states; means for transmitting an indication of a TCI state of the pool of TCI states for a communication in a frequency region that is not configured with a set of TCI states; and means for transmitting or receiving the communication using the TCI state. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
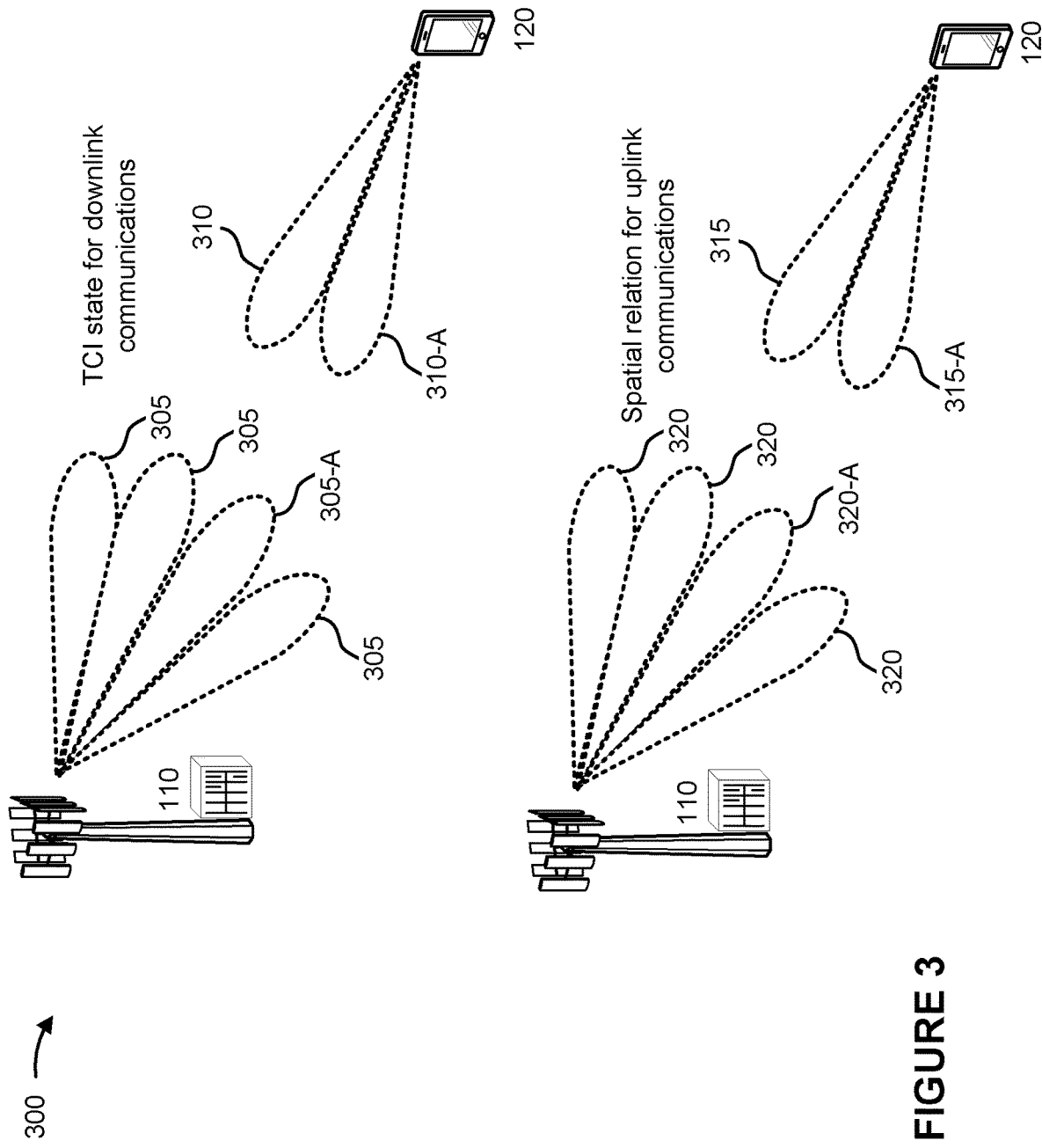
FIG. 3 is a diagram illustrating an example of using beams for communications between a base station and a UE in accordance with the present disclosure

FIG. 3 is a diagram illustrating an example 300 of using beams for communications between a base station and a UE in accordance with the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional B S transmit beam, and the UE 120 may receive the transmission using a directional UE receive beam. Each BS transmit beam may have an associated beam identifier, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters (referred to herein as parameters) at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a TCI state. A TCI state may indicate a directionality or a characteristic of the downlink beam, such as one or more quasi co-location (QCL) properties of the downlink beam. A QCL property may include, for example, a parameter such as a Doppler shift, a Doppler spread, an average delay, a delay spread, or spatial receive parameters, among other examples. In some examples, each BS transmit beam 305 may be associated with a synchronization signal block (SSB, sometimes referred to as a synchronization signal/physical broadcast channel (SS/PBCH) block), and the UE 120 may indicate a preferred BS transmit beam 305 by transmitting uplink transmissions in resources of the SSB that are associated with the preferred BS transmit beam 305. A particular SSB may have an associated TCI state (for example, for an antenna port or for beamforming). The base station 110 may, in some examples, indicate a downlink BS transmit beam 305 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

The set of activated TCI states may be selected from a pool of TCI states that are configured, for example, via RRC signaling. In some aspects, the pool of TCI states may be associated with a communicating frequency region. A communicating frequency region is a frequency region on which a UE 120 or a base station 110 is to transmit or receive a communication. A frequency region is a configured frequency area on which a UE 120 or a base station 110 can communicate. Examples of frequency regions include bandwidth parts and component carriers. If the UE 120 or the base station 110 is to perform a communication on a particular frequency region (such as a bandwidth part or component carrier) then the UE 120 or the base station 110 may use a TCI state from a pool configured for the particular frequency region. The techniques and apparatuses described herein provide a reference pool of TCI states, which can be used for a communication on a frequency region that is not configured with its own pool of TCI states.

Similarly, for uplink communications, the UE 120 may transmit in the direction of the base station 110 using a directional UE transmit beam, and the base station 110 may receive the transmission using a directional BS receive beam. Each UE transmit beam may have an associated beam identifier (ID), beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

Figure 4:
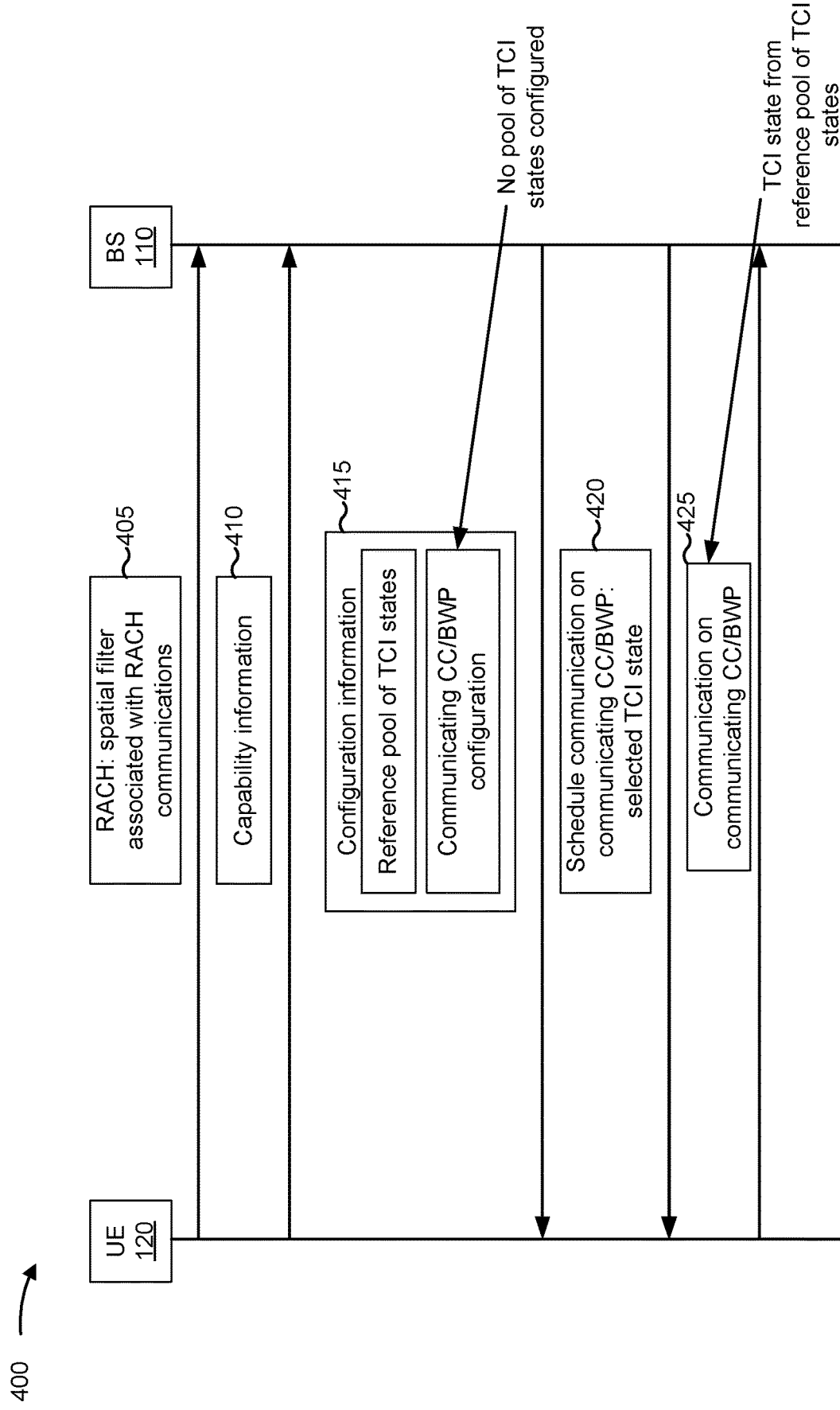
FIG. 4 is a diagram illustrating an example of communication using a reference pool of transmission configuration indicator (TCI) states in accordance with the present disclosure.

FIG. 4 is a diagram illustrating an example 400 of communication using a reference pool of TCI states in accordance with the present disclosure. As shown, the example 400 includes a UE 120 and a BS 110.

As shown, the UE 120 may transmit a random access channel (RACH) 405. For example, the UE 120 may perform initial access with the BS 110. As further shown, the UE 120 may transmit the RACH 405 using a spatial filter (which may be defined by a spatial relation) associated with RACH communications. For example, before RRC configuration of a pool of TCI states (such as in any frequency region), the UE 120 may use the spatial filter for communication. In some aspects, the UE 120 may transmit, prior to receiving the configuration information, a random access communication (such as RACH 405) using a spatial filter or TCI state associated with random access communications. Thus, the UE 120 may use a RACH beam for RACH communications. After a pool of TCI states (such as a reference pool of TCI states) is configured, the UE 120 may use a configured pool of TCI states for communication on a frequency region, and, if no pool of TCI states is configured for a frequency region, the UE 120 may use a reference pool of TCI states, as described below.

As shown, the UE 120 may transmit, and the BS 110 may receive, capability information 410. For example, the UE 120 may transmit the capability information 410 via RRC signaling, medium access control (MAC) signaling, uplink control information, or a combination thereof. The capability information 410 may indicate one or more capabilities of the UE 120. For example, the one or more capabilities may relate to configuration or usage of a reference pool of TCI states.

In some aspects, the capability information 410 may indicate a maximum number of pools of TCI states supported by the UE 120. For example, the capability information 410 may indicate a number of pools of TCI states supported by the UE 120 across all frequency regions of the UE 120. That is, the capability information 410 may indicate the maximum number of TCI state pool across bandwidth parts (BWPs) and component carriers (CCs) in a band, where the maximum number is at least one. In some aspects, the capability information 410 may indicate to configure only a single reference pool of TCI states. In some aspects, the capability information 410 may indicate a maximum number of configured and activated TCI states across frequency regions in a band. In some aspects, the capability information 410 may indicate whether the UE 120 supports the reference pool of TCI states across multiple frequency regions. For example, the capability information 410 may indicate whether the UE 120 supports the configuration of a reference pool of TCI states (or a TCI state) across multiple component carriers. If the UE 120 does not support the configuration of a reference pool of TCI states, then the BS 110 may configure pools of TCI states on a per component carrier basis or a per bandwidth part basis (not shown in FIG. 4).

As shown, the BS 110 may transmit, and the UE 120 may receive, configuration information 415. For example, the BS 110 may transmit the configuration information 415 via RRC signaling, MAC signaling, downlink control information (DCI), or a combination thereof. As shown, the configuration information 415 may configure a reference pool of TCI states. A reference pool of TCI states is a group of one or more TCI states that can be used for a communication on a communicating frequency region if the communicating frequency region is not explicitly configured with a dedicated pool of TCI states. As further shown, the configuration information 415 may configure a communicating frequency region (such as a BWP or CC). A communicating frequency region is a frequency region in which the UE 120 performs a communication, such as the communication 425. As shown, the communicating frequency region is not configured with a pool of TCI states. For example, the configuration information 415 may not indicate a pool of TCI states that is specific to the communicating frequency region.

In some aspects, the configuration information 415 may include information indicating the reference pool of TCI states for the communicating frequency region. For example, the configuration information 415 may include a field or a pointer that indicates that the communicating frequency region is associated with a reference frequency region. In such examples, if a pool of TCI states is absent in the communicating frequency region's configuration, then a field in the communicating frequency region's configuration may be configured to indicate a reference frequency region, and the reference frequency region's pool of TCI states may be the reference pool of TCI states.

In some aspects, the configuration information 415 may configure a reference frequency region. The UE 120 may receive the configuration information 415 indicating the reference frequency region for TCI state selection for the communicating frequency region. In some aspects, the configuration information 415 indicating the reference frequency region may be associated with the communicating frequency region. A pool of TCI states configured for the reference frequency region may be used as the reference pool of TCI states. When a communicating frequency region is not configured with a pool of TCI states, then the UE 120 may use the reference frequency region's configuration (such as the reference pool of TCI states configured for the reference frequency region) in the communicating frequency region.

In some aspects, the configuration information 415 may indicate a set of frequency regions. Each frequency region in a set of frequency regions may share a pool of TCI states. For example, the pool of TCI states may be a reference pool of TCI states for each frequency region in the set of frequency regions. In some aspects, multiple lists of frequency regions may be configured, and each set of frequency regions may be associated with a respective reference pool of TCI states (which can be different for each set of frequency regions, or can be the same for two or more lists of frequency regions). If a set of frequency regions includes the communicating frequency region, the communicating frequency region may be associated with the reference frequency region (for TCI state selection) of the set of frequency regions.

In some aspects, any frequency region of a set of frequency regions can be configured as the reference frequency region. For example, the configuration information 415 may indicate which frequency region is the reference frequency region (such as by a component carrier identifier or an index of the component carrier in the list). As another example, only one frequency region in the set of frequency regions may be configured with a pool of TCI states, and may therefore implicitly be selected as the reference pool of TCI states. In some aspects, the reference frequency region may be fixed within the set of frequency regions. For example, the reference frequency region may be specified to be a specific frequency region (such as a first frequency region in the list, a last frequency region in the list, a frequency region with a smallest component carrier identifier, or a frequency region with a largest component carrier identifier). In some aspects, the reference frequency region is a frequency region that most recently received an RRC configuration of a pool of TCI states.

In some aspects, the configuration information 415 may indicate a pool of TCI states that is not associated with any particular frequency region. For example, the pool of TCI states may be a common pool of TCI states that is not associated with a component carrier identifier or a bandwidth part identifier. The common pool of TCI states may be used as the reference pool of TCI states for any frequency region that is not associated with a TCI pool configuration (that is, a configured pool of TCI states). In some aspects, the common pool of TCI states may be defined as a common shared channel such as a common PDSCH configuration, which may not be associated with a component carrier or bandwidth part. In some aspects, the common PDSCH configuration may be independent of a communicating frequency region of the UE 120. If a communicating frequency region is not configured with a pool of TCI states, then the UE 120 may apply the common pool of TCI states in the communicating frequency region.

In some aspects, the BS 110 may transmit, and the UE 120 may receive, signaling to update the configuration information 415 (not shown), such as to activate or deactivate a TCI state, to add or remove or change a TCI state, or to change a relationship between a communicating frequency region and a reference pool of TCI states. For example, the signaling may be to update a reference pool configuration or a reference frequency region configuration. In some aspects, the signaling may be MAC signaling, or may be DCI.

As shown, the BS 110 may transmit, and the UE 120 may receive, scheduling information 420. The scheduling information 420 may schedule a communication 425 on a communicating frequency region (such as a communicating bandwidth part or component carrier). The scheduling information 420 may indicate a selected TCI state. For example, the scheduling information 420 may include DCI or MAC signaling indicating the selected TCI state. In some aspects, the scheduling information 420 may indicate a TCI state index associated with the selected TCI state. In some aspects, the selected TCI state may have been previously activated, such as via MAC signaling or DCI. For example, the selected TCI state may be activated for one or more of the reference frequency region or the communicating frequency region.

As shown, the UE 120 may transmit (or receive) the communication 425 on the communicating frequency region. For example, as shown, the UE 120 may use a TCI state from the reference pool of TCI states to transmit or receive the communication 425. The UE 120 may identify the reference pool of TCI states, such as based at least in part on the configuration information 415 or a pre-configuration of the UE 120. The UE 120 may use the selected TCI state of the reference pool of TCI states (as compared to a TCI state of a pool of TCI states specific to the communicating frequency region) to transmit (or receive) the communication 425. For example, transmitting or receiving the communication using the TCI state may be based at least in part on the frequency region not being configured with a set of TCI states (such as a pool of TCI states). In some aspects, the reference pool of TCI states may be used for any frequency region that is not configured with a set of TCI states (such as a pool of TCI states). Thus, a reference pool of TCI states, which can be used to support communications in multiple frequency regions, is configured and used for communication. By configuring the reference pool of TCI states, overhead is reduced relative to configuring separate pools of TCI states for each frequency region supported by the UE 120.

In some aspects, the UE 120 may transmit a beam failure recovery request (BFRQ) (not shown in FIG. 4). The UE 120 may transmit the BFRQ based at least in part on detecting a beam failure of a communicating beam of the UE 120 in a communicating frequency region. Since the UE 120 has detected beam failure of the communicating beam, the UE 120 cannot (or should not) use the communicating beam to transmit the BFRQ. If the communicating beam is defined by a reference pool of TCI states (such as if the BFRQ is reported in a reference frequency region or for any frequency region in a set of frequency regions associated with the reference pool of TCI states), then the UE 120 may use a spatial filter or TCI state associated with BFRQ transmission to transmit the BFRQ. In some aspects, the UE 120 may use the spatial filter or TCI state associated with BFRQ transmission until a reconfiguration of the reference pool of TCI states is received. In some aspects, the spatial filter or TCI state associated with BFRQ transmission may be a RACH beam failure recovery (BFR) beam or a replacement beam. Thus, the UE 120 may assume that the reference pool of TCI states' configuration is no longer valid based at least in part on the BFRQ, and may use the RACH BFR beam or a replacement beam for communication until TCI state pool reconfiguration occurs.

Figure 5:
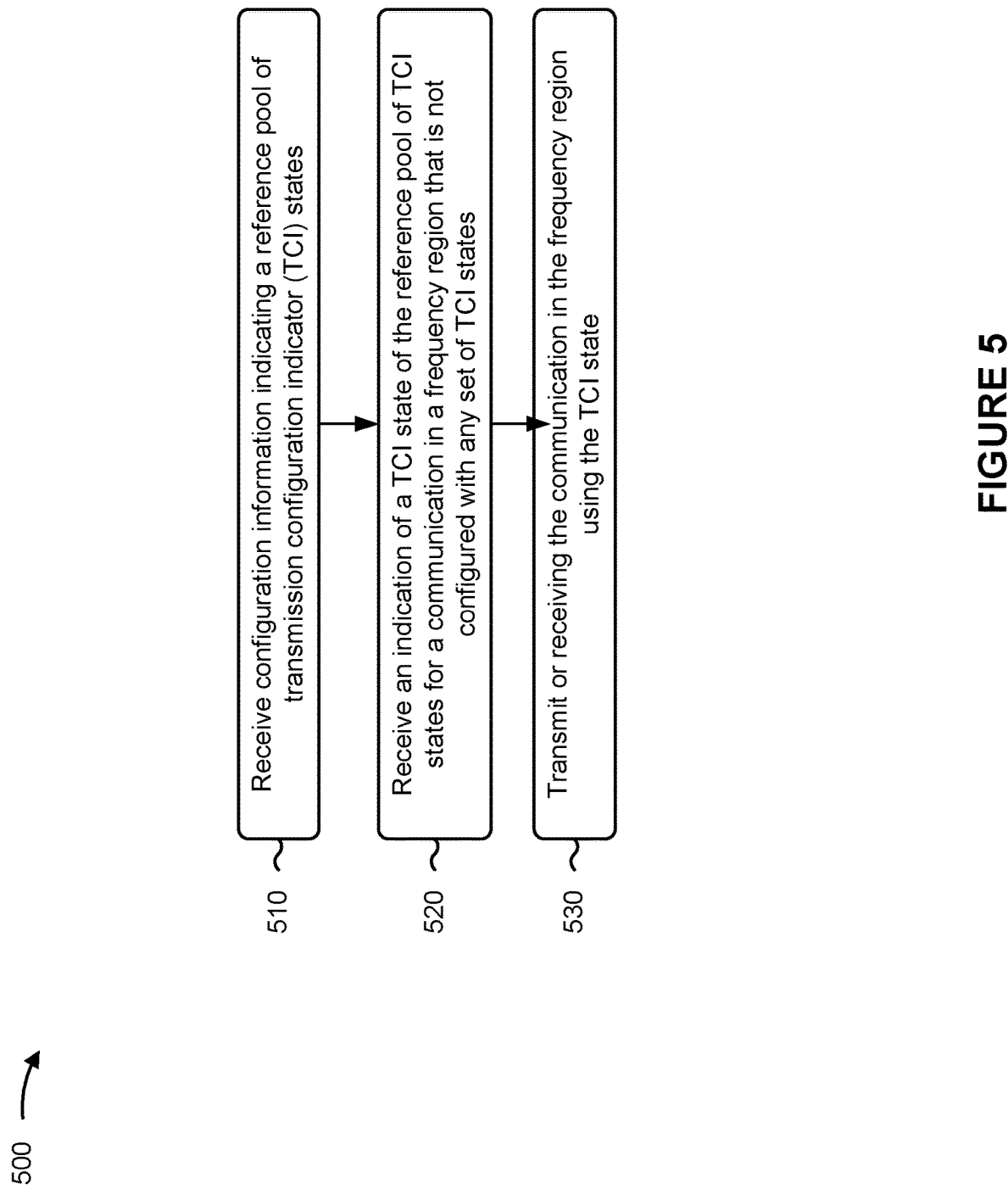
FIG. 5 is a flowchart illustrating an example process performed, for example, by a UE, that supports the use of a reference pool of TCI states in accordance with the present disclosure.

FIG. 5 is a flowchart illustrating an example process 500 performed, for example, by a UE in accordance with the present disclosure. Example process 500 is an example where an apparatus of the UE (for example, UE 120) performs operations associated with a reference TCI pool.

As shown in FIG. 5, in some aspects, process 500 may include receiving configuration information indicating a reference pool of TCI states (block 510). For example, the UE (such as by using communication manager 140 or reception component 702, depicted in FIG. 7) may receive configuration information indicating a reference pool of TCI states, as described above.

As shown in FIG. 5, in some aspects, process 500 may include receiving an indication of a TCI state of the reference pool of TCI states for a communication in a frequency region that is not configured with any set of TCI states (block 520). For example, the UE (such as by using communication manager 140 or reception component 702, depicted in FIG. 7) may receive an indication of a TCI state of the reference pool of TCI states for a communication in a frequency region that is not configured with any set of TCI states (such as a pool of TCI states), as described above.

As further shown in FIG. 5, in some aspects, process 500 may include transmitting or receiving the communication in the frequency region using the TCI state (block 530). For example, the UE (such as by using communication manager 140 or transmission component 704, depicted in FIG. 7) may transmit or receive the communication in the frequency region using the TCI state, as described above.

Process 500 may include additional aspects, such as any single aspect or any combination of aspects described below or in connection with one or more other processes described elsewhere herein.

In a first additional aspect, the frequency region is at least one of a bandwidth part or a component carrier.

In a second additional aspect, alone or in combination with the first aspect, the reference pool of TCI states is configured for a reference frequency region.

In a third additional aspect, alone or in combination with one or more of the first and second aspects, process 500 includes receiving information indicating that the reference frequency region is to be used for TCI state selection for the communication in the frequency region; and selecting the TCI state from the reference pool of TCI states configured for the reference frequency region in accordance with the information indicating that the reference frequency region is to be used for TCI state selection.

In a fourth additional aspect, alone or in combination with one or more of the first through third aspects, the information indicating that the reference frequency region is to be used for TCI state selection is received in configuration information associated with the frequency region in which the communication is performed.

In a fifth additional aspect, alone or in combination with one or more of the first through fourth aspects, the information indicating that the reference frequency region is to be used indicates a set of frequency regions, including the communicating frequency region, that are associated with the reference frequency region for TCI state selection.

In a sixth additional aspect, alone or in combination with one or more of the first through fifth aspects, the information indicating that the reference frequency region is to be used for TCI state selection indicates a set of frequency regions, including the frequency region in which the communication is performed, that are associated with the reference frequency region for TCI state selection.

In a seventh additional aspect, alone or in combination with one or more of the first through sixth aspects, the reference pool of TCI states is used for any frequency region that is not configured with any set of TCI states.

In an eighth additional aspect, alone or in combination with one or more of the first through seventh aspects, the reference pool of TCI states is associated with a common shared channel configuration.

In a ninth additional aspect, alone or in combination with one or more of the first through eighth aspects, the common shared channel configuration is independent of the frequency region of the UE in which the communication is performed.

In a tenth additional aspect, alone or in combination with one or more of the first through ninth aspects, the configuration information is received via at least one of radio resource control signaling, medium access control signaling, or downlinking control information.

In an eleventh additional aspect, alone or in combination with one or more of the first through tenth aspects, process 500 includes transmitting, prior to receiving the configuration information, a random access communication using a spatial filter or TCI state associated with random access communications.

In a twelfth additional aspect, alone or in combination with one or more of the first through eleventh aspects, process 500 includes transmitting a beam failure recovery request (BFRQ) for a beam associated with the reference pool of TCI states using a spatial filter or TCI state associated with BFRQ transmission.

In a thirteenth additional aspect, alone or in combination with one or more of the first through twelfth aspects, the TCI state associated with BFRQ transmission is used until a reconfiguration of the reference pool of TCI states is received.

In a fourteenth additional aspect, alone or in combination with one or more of the first through thirteenth aspects, process 500 includes transmitting capability information indicating at least one of a number of pools of TCI states supported by the UE across all frequency regions of the UE, a maximum number of configured and activated TCI states across frequency regions in a band, or whether the UE supports the reference pool of TCI states across multiple frequency regions.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
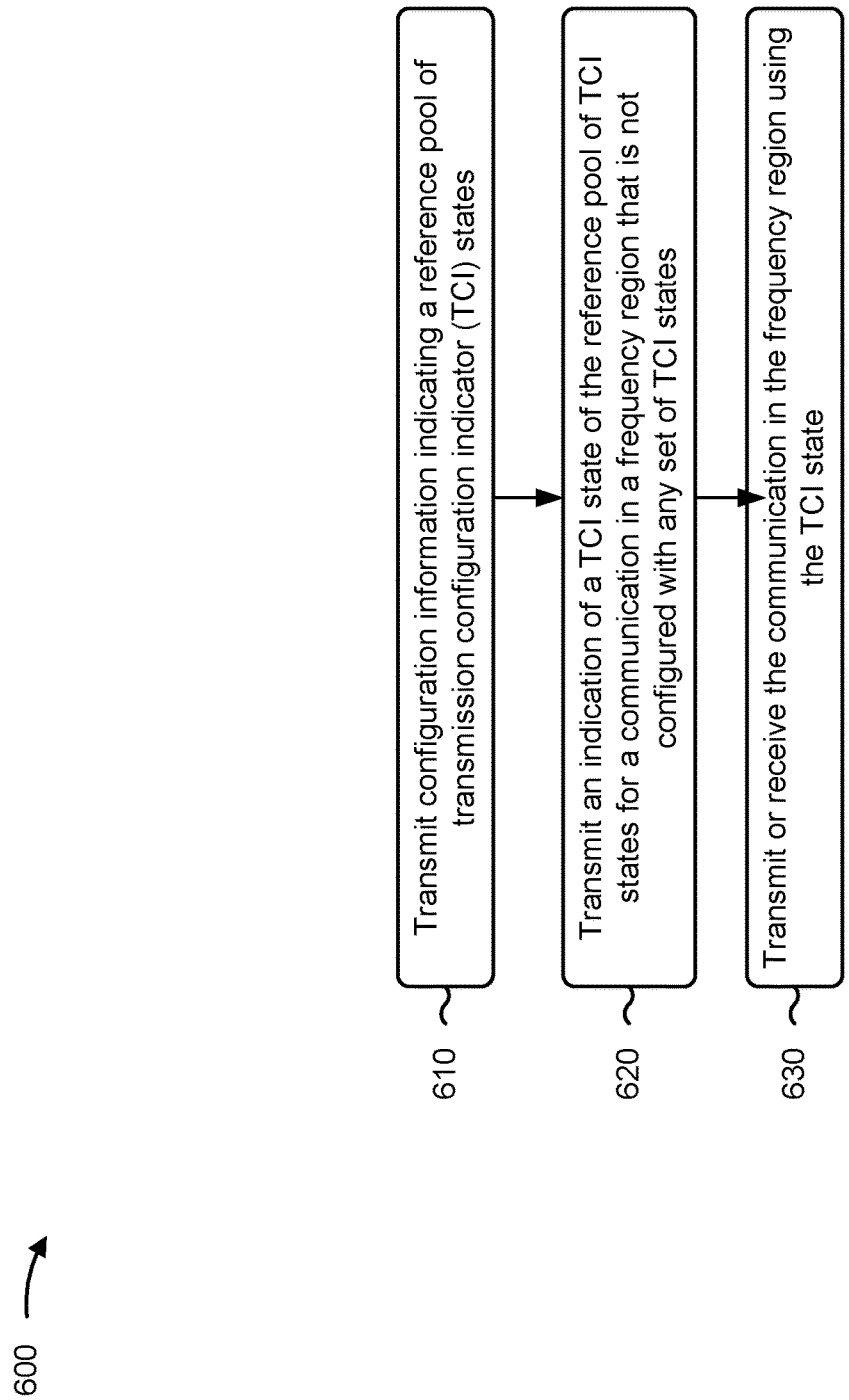
FIG. 6 is a flowchart illustrating an example process performed, for example, by a base station, that supports the use of a reference pool of TCI states in accordance with the present disclosure.

FIG. 6 is a flowchart illustrating an example process 600 performed, for example, by a base station in accordance with the present disclosure. Example process 600 is an example where an apparatus of the base station (for example, base station 110) performs operations associated with a reference TCI pool.

As shown in FIG. 6, in some aspects, process 600 may include transmitting configuration information indicating a reference pool of TCI states (block 610). For example, the base station (such as by using communication manager 150 or transmission component 804, depicted in FIG. 8) may transmit configuration information indicating a reference pool of TCI states, as described above.

As further shown in FIG. 6, in some aspects, process 600 may include transmitting an indication of a TCI state of the pool of TCI states for a communication in a frequency region that is not configured with any set of TCI states (block 620). For example, the base station (such as by using communication manager 150 or transmission component 804, depicted in FIG. 8) may transmit an indication of a TCI state of the pool of TCI states for a communication in a frequency region that is not configured with any set of TCI states (such as any pool of TCI states), as described above.

As further shown in FIG. 6, in some aspects, process 600 may include transmitting or receiving the communication using the TCI state (block 630). For example, the base station (such as by using communication manager 150 or reception component 802, depicted in FIG. 8) may transmit or receive the communication in the frequency region using the TCI state, as described above.

Process 600 may include additional aspects, such as any single aspect or any combination of aspects described below or in connection with one or more other processes described elsewhere herein.

In a first additional aspect, the frequency region is at least one of a bandwidth part or a component carrier.

In a second additional aspect, alone or in combination with the first aspect, the reference pool of TCI states is configured for a reference frequency region and wherein the frequency region that is not configured with the set of TCI states is a communicating frequency region.

In a third additional aspect, alone or in combination with one or more of the first and second aspects, process 600 includes transmitting information indicating that the reference frequency region is to be used for TCI state selection for the frequency region in which the communication is performed.

In a fourth additional aspect, alone or in combination with one or more of the first through third aspects, the information indicating that the reference frequency region is to be used is transmitted in configuration information associated with the frequency region in which the communication is performed.

In a fifth additional aspect, alone or in combination with one or more of the first through fourth aspects, the information indicating that the reference frequency region is to be used indicates a set of frequency regions, including the frequency region in which the communication is performed, that are associated with the reference frequency region for TCI state selection.

In a sixth additional aspect, alone or in combination with one or more of the first through fifth aspects, transmitting or receiving the communication using the TCI state is based at least in part on the frequency region in which the communication is performed not being configured with any set of TCI states.

In a seventh additional aspect, alone or in combination with one or more of the first through sixth aspects, the reference pool of TCI states is used for any frequency region that is not configured with a set of TCI states.

In an eighth additional aspect, alone or in combination with one or more of the first through seventh aspects, the reference pool of TCI states is associated with a common shared channel configuration.

In a ninth additional aspect, alone or in combination with one or more of the first through eighth aspects, the common shared channel configuration is independent of a frequency region of the UE in which the communication is performed.

In a tenth additional aspect, alone or in combination with one or more of the first through ninth aspects, the configuration information is transmitted via at least one of radio resource control signaling, medium access control signaling, or downlinking control information.

In an eleventh additional aspect, alone or in combination with one or more of the first through tenth aspects, process 600 includes receiving, prior to transmitting the configuration information, a random access communication using a spatial filter or TCI state associated with random access communications.

In a twelfth additional aspect, alone or in combination with one or more of the first through eleventh aspects, process 600 includes receiving a BFRQ for a beam associated with the reference pool of TCI states using a spatial filter or TCI state associated with BFRQ transmission.

In a thirteenth additional aspect, alone or in combination with one or more of the first through twelfth aspects, the TCI state associated with BFRQ transmission is used until a reconfiguration of the reference pool of TCI states is transmitted.

In a fourteenth additional aspect, alone or in combination with one or more of the first through thirteenth aspects, process 600 includes receiving capability information indicating at least one of a number of pools of TCI states supported by a UE across all frequency regions of the UE, a maximum number of configured and activated TCI states across frequency regions in a band, or whether the UE supports the reference pool of TCI states across multiple frequency regions, wherein the configuration information is based at least in part on the capability information.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
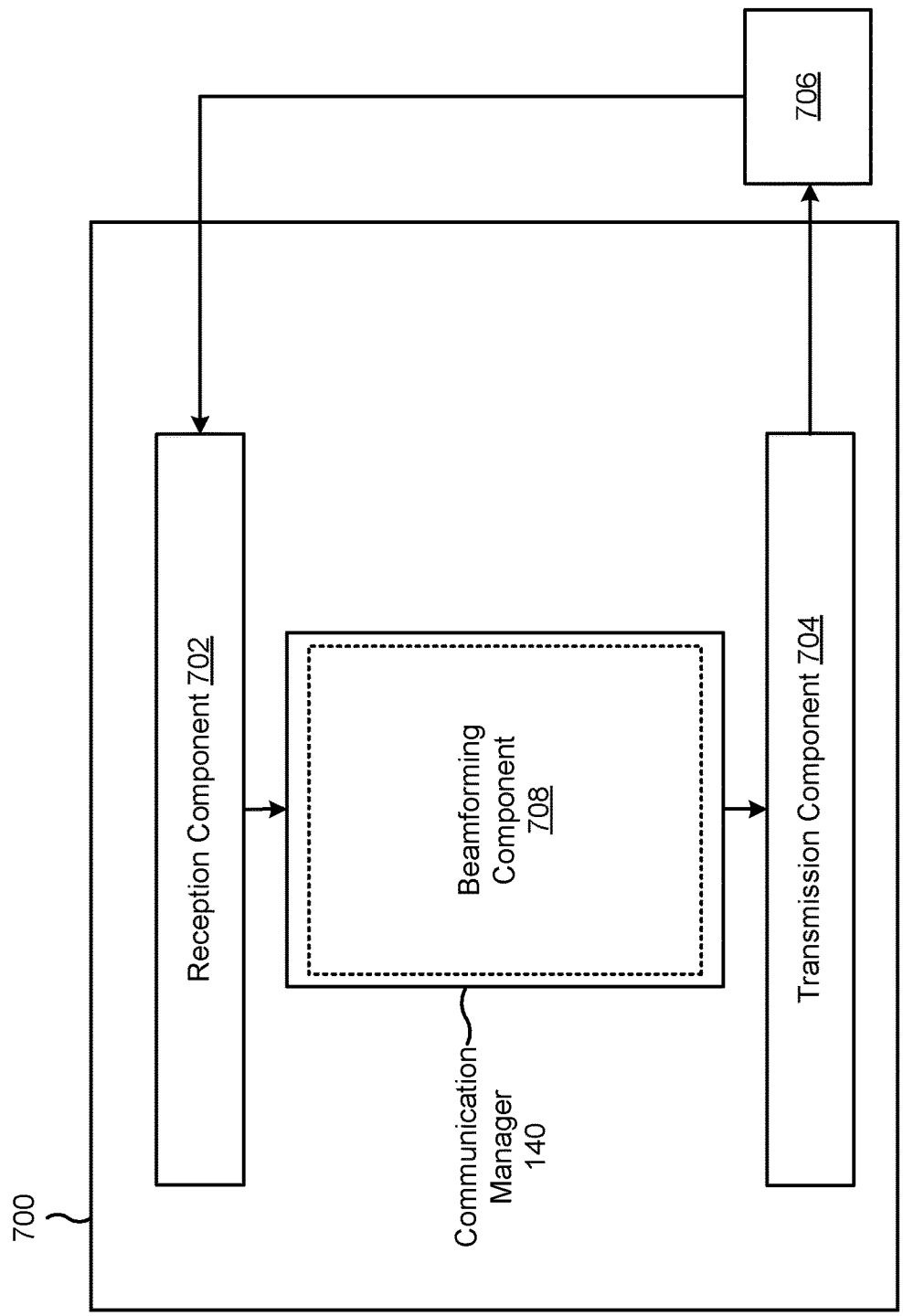
FIG. 7 is a diagram of an example apparatus for wireless communication that supports the use of a reference pool of TCI states in accordance with the present disclosure.

FIG. 7 is a diagram of an example apparatus 700 for wireless communication in accordance with the present disclosure. The apparatus 700 may be a UE, or a UE may include the apparatus 700. In some aspects, the apparatus 700 includes a reception component 702, a transmission component 704, and a communication manager 140, which may be in communication with one another (for example, via one or more buses). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIGS. 3-4. Additionally or alternatively, the apparatus 700 may be configured to perform one or more processes described herein, such as process 500 of FIG. 5, or a combination thereof. In some aspects, the apparatus 700 may include one or more components of the UE described above in connection with FIG. 2.

The reception component 702 may receive communications, such as reference signals, control information, data communications, or a combination thereof, from the apparatus 706. The reception component 702 may provide received communications to one or more other components of the apparatus 700, such as the communication manager 140. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a modem, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, the communication manager 140 may generate communications and may transmit the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The communication manager 140 may receive or may cause the reception component 702 to receive configuration information indicating a reference pool of TCI states. The communication manager 140 may transmit or may cause the transmission component 704 or the beamforming component 708 to transmit or receive the communication in a frequency region using the TCI state. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a beamforming component 708, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive configuration information indicating a reference pool of TCI states. The reception component 702 may receive an indication of a TCI state of the reference pool of TCI states for a communication in a frequency region that is not configured with any set of TCI states. The reception component 702 or the beamforming component 708 may transmit or receive the communication using the TCI state.

The reception component 702 may receive information indicating that the reference frequency region is to be used for TCI state selection for the communicating frequency region.

The transmission component 704 or the beamforming component 708 may transmit, prior to receiving the configuration information, a random access communication using a spatial filter or TCI state associated with random access communications.

The transmission component 704 or the beamforming component 708 may transmit a BFRQ for a beam associated with the reference pool of TCI states using a spatial filter or TCI state associated with BFRQ transmission.

The transmission component 704 may transmit capability information indicating at least one of a number of pools of TCI states supported by the UE across all frequency regions of the UE, a maximum number of configured and activated TCI states across frequency regions in a band, or whether the UE supports the reference pool of TCI states across multiple frequency regions.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
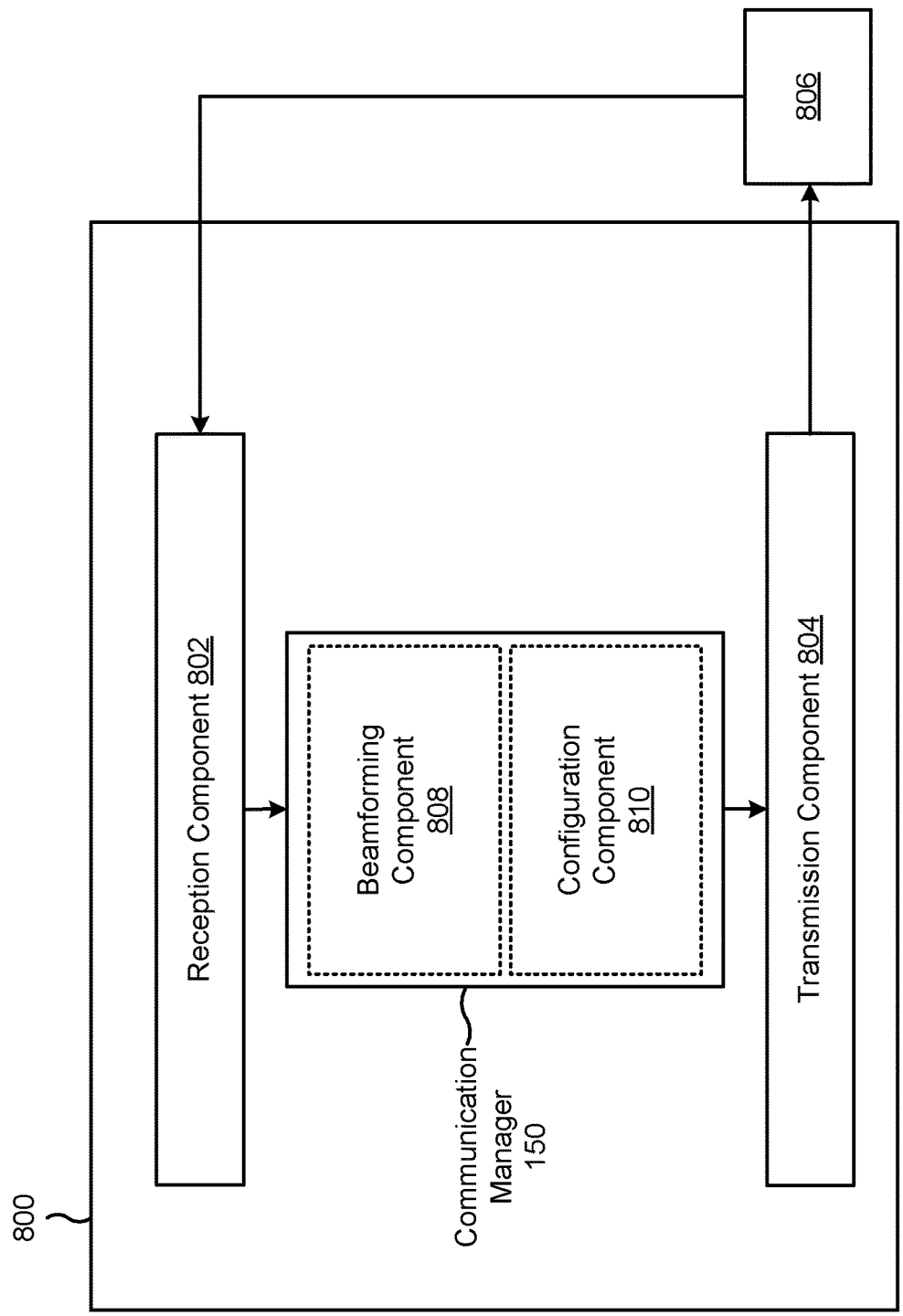
FIG. 8 is a diagram of an example apparatus for wireless communication that supports the use of a reference pool of TCI states in accordance with the present disclosure.

FIG. 8 is a diagram of an example apparatus 800 for wireless communication in accordance with the present disclosure. The apparatus 800 may be a base station, or a base station may include the apparatus 800. In some aspects, the apparatus 800 includes a reception component 802, a transmission component 804, and a communication manager 150, which may be in communication with one another (for example, via one or more buses). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIGS. 3-4. Additionally or alternatively, the apparatus 800 may be configured to perform one or more processes described herein, such as process 600 of FIG. 6, or a combination thereof. In some aspects, the apparatus 800 may include one or more components of the base station described above in connection with FIG. 2.

The reception component 802 may receive communications, such as reference signals, control information, data communications, or a combination thereof, from the apparatus 806. The reception component 802 may provide received communications to one or more other components of the apparatus 800, such as the communication manager 150. In some aspects, the reception component 802 may perform signal processing on the received communications (such as filtering, amplification, demodulation, analog-todigital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, the communication manager 150 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The communication manager 150 may transmit or may cause the transmission component 804 or the configuration component 810 to transmit configuration information indicating a reference pool of TCI states. The communication manager 150 may transmit or may cause the transmission component 804 or the beamforming component 808 to transmit an indication of a TCI state of the reference pool of TCI states for a communication in a frequency region that is not configured with any set of TCI states. The communication manager 150 may transmit or may cause the transmission component 804 or the beamforming component 808 to transmit or receive the communication in the frequency region using the TCI state. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the base station described above in connection with FIG. 2. In some aspects, the communication manager 150 includes a set of components, such as a beamforming component 808, a configuration component 810, or a combination thereof. Alternatively, the set of components may be separate and distinct from the communication manager 150. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 804 or the configuration component 810 may transmit configuration information indicating a reference pool of TCI states. The transmission component 804 may transmit an indication of a TCI state of the reference pool of TCI states for a communication in a frequency region that is not configured with any set of TCI states. The transmission component 804 or the beamforming component 808 may transmit or receive the communication in the frequency region using the TCI state.

The transmission component 804 may transmit information indicating that the reference frequency region is to be used for TCI state selection for the communicating frequency region.

The reception component 802 may receive, prior to transmitting the configuration information, a random access communication using a spatial filter or TCI state associated with random access communications. The reception component 802 may receive a BFRQ for a beam associated with the reference pool of TCI states using a spatial filter or TCI state associated with BFRQ transmission. The reception component 802 may receive capability information indicating at least one of a number of pools of TCI states supported by a UE across all frequency regions of the UE, a maximum number of configured and activated TCI states across frequency regions in a band, or whether the UE supports the reference pool of TCI states across multiple frequency regions, wherein the configuration information is based at least in part on the capability information.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving configuration information indicating a reference pool of transmission configuration indicator (TCI) states; receiving an indication of a TCI state of the reference pool of TCI states for a communication in a frequency region that is not configured with any set of TCI states; and transmitting or receiving the communication in the frequency region using the TCI state.

Aspect 2: The method of Aspect 1, wherein the frequency region is at least one of a bandwidth part or a component carrier.

Aspect 3: The method of any of Aspects 1-2, wherein the reference pool of TCI states is configured for a reference frequency region.

Aspect 4: The method of Aspect 3, further comprising: receiving information indicating that the reference frequency region is to be used for TCI state selection for the communication in the frequency region; and selecting the TCI state from the reference pool of TCI states configured for the reference frequency region in accordance with the information indicating that the reference frequency region is to be used for TCI state selection.

Aspect 5: The method of Aspect 4, wherein the information indicating that the reference frequency region is to be used for TCI state selection is received in configuration information associated with the frequency region in which the communication is performed.

Aspect 6: The method of Aspect 4, wherein the information indicating that the reference frequency region is to be used for TCI state selection indicates a set of frequency regions, including the frequency region in which the communication is performed, that are associated with the reference frequency region for TCI state selection.

Aspect 7: The method of any of Aspects 1-6, wherein the reference pool of TCI states is used for any frequency region that is not configured with any set of TCI states.

Aspect 8: The method of any of Aspects 1-7, wherein the reference pool of TCI states is associated with a common shared channel configuration.

Aspect 9: The method of Aspect 8, wherein the common shared channel configuration is independent of the frequency region of the UE in which the communication is performed.

Aspect 10: The method of any of Aspects 1-9, further comprising: transmitting, prior to receiving the configuration information, a random access communication using a spatial filter or TCI state associated with random access communications.

Aspect 11: The method of any of Aspects 1-10, further comprising: transmitting a beam failure recovery request (BFRQ) for a beam associated with the reference pool of TCI states using a spatial filter or TCI state associated with BFRQ transmission.

Aspect 12: The method of Aspect 11, wherein the TCI state associated with BFRQ transmission is used until a reconfiguration of the reference pool of TCI states is received.

Aspect 13: The method of any of Aspects 1-12, further comprising: transmitting capability information indicating at least one of: a number of pools of TCI states supported by the UE across all frequency regions of the UE, a maximum number of configured and activated TCI states across frequency regions in a band, or whether the UE supports the reference pool of TCI states across multiple frequency regions.

Aspect 14: A method of wireless communication performed by a base station, comprising: transmitting configuration information indicating a reference pool of transmission configuration indicator (TCI) states; transmitting an indication of a TCI state of the pool of TCI states for a communication in a frequency region that is not configured with any set of TCI states; and transmitting or receiving the communication in the frequency region using the TCI state.

Aspect 15: The method of Aspect 14, wherein the frequency region is at least one of a bandwidth part or a component carrier.

Aspect 16: The method of any of Aspects 14-15, wherein the reference pool of TCI states is configured for a reference frequency region.

Aspect 17: The method of Aspect 16, further comprising: transmitting information indicating that the reference frequency region is to be used for TCI state selection for the frequency region in which the communication is performed.

Aspect 18: The method of Aspect 17, wherein the information indicating that the reference frequency region is to be used is transmitted in configuration information associated with the frequency region in which the communication is performed.

Aspect 19: The method of Aspect 17, wherein the information indicating that the reference frequency region is to be used indicates a set of frequency regions, including the frequency region in which the communication is performed, that are associated with the reference frequency region for TCI state selection.

Aspect 20: The method of any of Aspects 14-19, wherein transmitting or receiving the communication using the TCI state is based at least in part on the frequency region in which the communication is performed not being configured with any set of TCI states.

Aspect 21: The method of any of Aspects 14-20, wherein the reference pool of TCI states is used for any frequency region that is not configured with a set of TCI states.

Aspect 22: The method of any of Aspects 14-21, wherein the reference pool of TCI states is associated with a common shared channel configuration.

Aspect 23: The method of Aspect 22, wherein the common shared channel configuration is independent of a frequency region of the UE in which the communication is performed.

Aspect 24: The method of any of Aspects 14-23, further comprising: receiving, prior to transmitting the configuration information, a random access communication using a spatial filter or TCI state associated with random access communications.

Aspect 25: The method of any of Aspects 14-24, further comprising: receiving a beam failure recovery request (BFRQ) for a beam associated with the reference pool of TCI states using a spatial filter or TCI state associated with BFRQ transmission.

Aspect 26: The method of Aspect 25, wherein the TCI state associated with BFRQ transmission is used until a reconfiguration of the reference pool of TCI states is transmitted.

Aspect 27: The method of any of Aspects 14-26, further comprising: receiving capability information indicating at least one of: a number of pools of TCI states supported by a user equipment (UE) across all frequency regions of the UE, a maximum number of configured and activated TCI states across frequency regions in a band, or whether the UE supports the reference pool of TCI states across multiple frequency regions, wherein the configuration information is based at least in part on the capability information.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   at least one processor; and
   at least one memory communicatively coupled with the at least one processor and storing processor-readable code that, when executed by the at least one processor, causes the UE to:
   transmit capability information indicating one or more capabilities of the UE related to configuration or usage of a reference pool of transmission configuration indicator (TCI) states, the reference pool of TCI states being for a communicating frequency region that is not configured with a pool of TCI states;
   receive an indication of a TCI state of the reference pool of TCI states for a communication in a frequency region that is not configured with any set of TCI states; and
   transmit or receiving the communication in the frequency region using the TCI state.

2. The UE of claim 1, wherein the frequency region is at least one of a bandwidth part or a component carrier.

3. The UE of claim 1, wherein the reference pool of TCI states is configured for a reference frequency region.

4. The UE of claim 3, wherein the at least one memory further stores processor-readable code that, when executed by the at least one processor, causes the UE to:
   receive information indicating that the reference frequency region is to be used for TCI state selection for the communication in the frequency region; and
   select the TCI state from the reference pool of TCI states configured for the reference frequency region in accordance with the information indicating that the reference frequency region is to be used for TCI state selection.

5. The UE of claim 4, wherein the information indicating that the reference frequency region is to be used for TCI state selection is received in configuration information associated with the frequency region in which the communication is performed.

6. The UE of claim 4, wherein the information indicating that the reference frequency region is to be used for TCI state selection indicates a set of frequency regions, including the frequency region in which the communication is performed, that are associated with the reference frequency region for TCI state selection.

7. The UE of claim 1, wherein the reference pool of TCI states is used for any frequency region that is not configured with any set of TCI states.

8. The UE of claim 1, wherein the reference pool of TCI states is associated with a common shared channel configuration.

9. The UE of claim 8, wherein the common shared channel configuration is independent of the frequency region of the UE in which the communication is performed.

10. The UE of claim 1, wherein the at least one memory further stores processor-readable code that, when executed by the at least one processor, causes the UE to:
    transmit a random access communication using a spatial filter or TCI state associated with random access communications.

11. The UE of claim 1, wherein the at least one memory further stores processor-readable code that, when executed by the at least one processor, causes the UE to:

transmit a beam failure recovery request (BFRQ) for a beam associated with the reference pool of TCI states using a spatial filter or TCI state associated with BFRQ transmission.

12. The UE of claim 11, wherein the TCI state associated with BFRQ transmission is used until a reconfiguration of the reference pool of TCI states is received.

13. The UE of claim 1, wherein the at least one memory further stores processor-readable code that, when executed by the at least one processor, causes the UE to:
transmit the capability information indicating at least one of:
a number of pools of TCI states supported by the UE across all frequency regions of the UE,
a maximum number of configured and activated TCI states across frequency regions in a band, or
whether the UE supports the reference pool of TCI states across multiple frequency regions.

14. A base station for wireless communication, comprising:
at least one processor; and
at least one memory communicatively coupled with the at least one processor and storing processor-readable code that, when executed by the at least one processor, causes the base station to:
receive capability information indicating one or more capabilities related to configuration or usage of a reference pool of transmission configuration indicator (TCI) states, the reference pool of TCI states being for a communicating frequency region that is not configured with a pool of TCI states;
transmit an indication of a TCI state of the pool of TCI states for a communication in a frequency region that is not configured with any set of TCI states; and
transmit or receiving the communication in the frequency region using the TCI state.

15. The base station of claim 14, wherein the frequency region is at least one of a bandwidth part or a component carrier.

16. The base station of claim 14, wherein the reference pool of TCI states is configured for a reference frequency region.

17. The base station of claim 16, wherein the at least one memory further stores processor-readable code that, when executed by the at least one processor, causes the base station to:
transmit information indicating that the reference frequency region is to be used for TCI state selection for the frequency region in which the communication is performed.

18. The base station of claim 14, wherein transmitting or receiving the communication using the TCI state is based at least in part on the frequency region in which the communication is performed not being configured with any set of TCI states.

19. The base station of claim 14, wherein the reference pool of TCI states is associated with a common shared channel configuration.

20. The base station of claim 19, wherein the common shared channel configuration is independent of a frequency region in which the communication is performed.

21. The base station of claim 14, wherein the at least one memory further stores processor-readable code that, when executed by the at least one processor, causes the base station to:
receive a random access communication using a spatial filter or TCI state associated with random access communications.

22. The base station of claim 14, wherein the at least one memory further stores processor-readable code that, when executed by the at least one processor, causes the base station to:
receive a beam failure recovery request (BFRQ) for a beam associated with the reference pool of TCI states using a spatial filter or TCI state associated with BFRQ transmission.

23. The base station of claim 22, wherein the TCI state associated with BFRQ transmission is used until a reconfiguration of the reference pool of TCI states is transmitted.

24. The base station of claim 14, wherein the at least one memory further stores processor-readable code that, when executed by the at least one processor, causes the base station to:
receive the capability information indicating at least one of:
a number of pools of TCI states supported by a user equipment (UE) across all frequency regions of the UE,
a maximum number of configured and activated TCI states across frequency regions in a band, or
whether the UE supports the reference pool of TCI states across multiple frequency regions.

25. A method of wireless communication performed by a user equipment (UE), comprising:
transmitting capability information indicating one or more capabilities of the UE related to configuration or usage of a reference pool of transmission configuration indicator (TCI) states, the reference pool of TCI states being for a communicating frequency region that is not configured with a pool of TCI states;
receiving an indication of a TCI state of the reference pool of TCI states for a communication in a frequency region that is not configured with any set of TCI states; and
transmitting or receiving the communication in the frequency region using the TCI state.

26. The method of claim 25, wherein the frequency region is at least one of a bandwidth part or a component carrier.

27. The method of claim 25, wherein the reference pool of TCI states is configured for a reference frequency region.

28. A method of wireless communication performed by a base station, comprising:
receiving capability information indicating one or more capabilities related to configuration or usage of a reference pool of transmission configuration indicator (TCI) states, the reference pool of TCI states being for a communicating frequency region that is not configured with a pool of TCI states;
transmitting an indication of a TCI state of the pool of TCI states for a communication in a frequency region that is not configured with any set of TCI states; and
transmitting or receiving the communication in the frequency region using the TCI state.

29. The method of claim 28, wherein the frequency region is at least one of a bandwidth part or a component carrier.

30. The method of claim 28, wherein the reference pool of TCI states is configured for a reference frequency region.

* * * * *